UNITED STATES PATENT OFFICE.

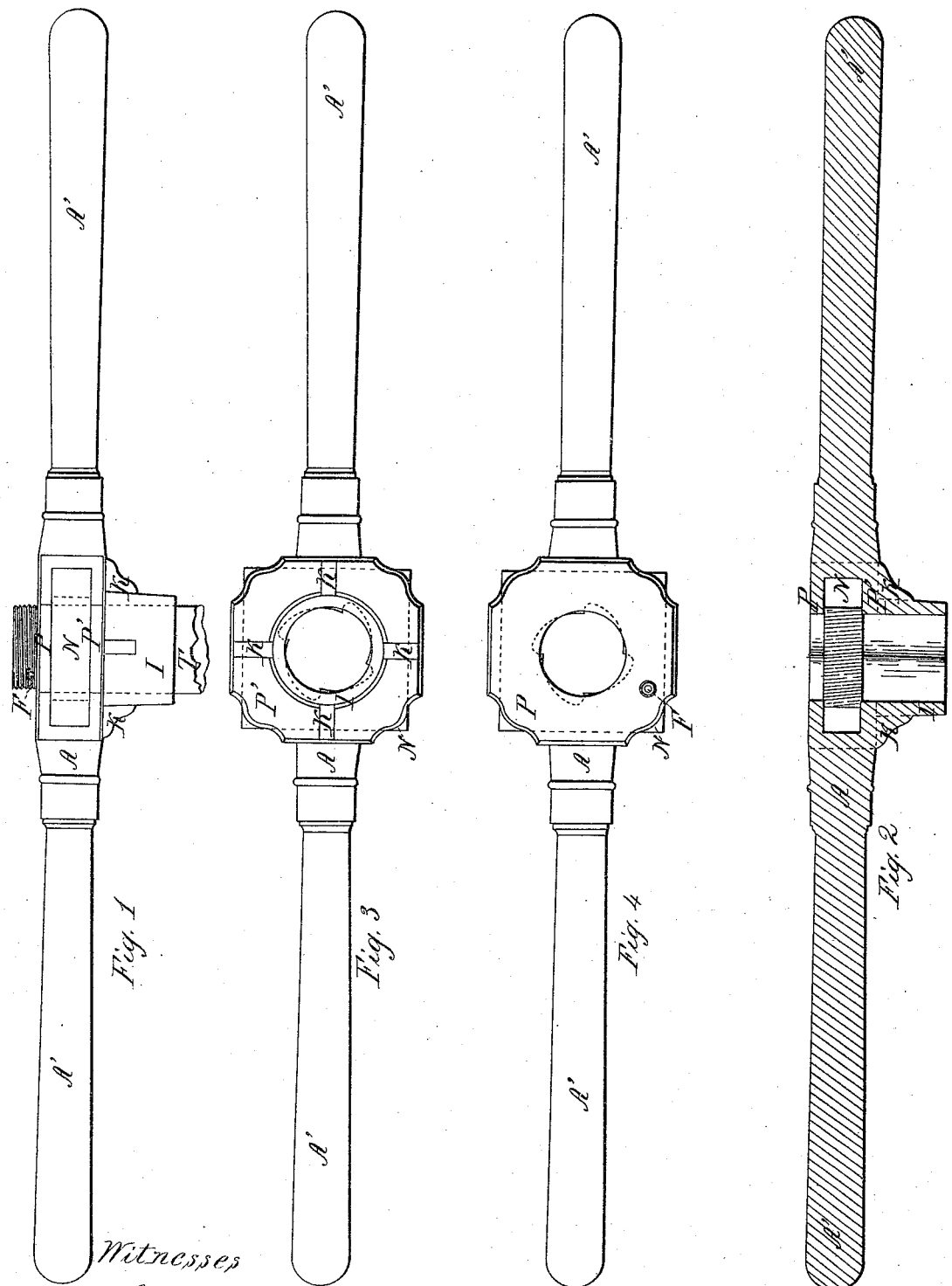

ALBERT P. PITKIN, OF HARTFORD, CONNECTICUT.

SCREW-DIE.

Specification of Letters Patent No. 24,236, dated May 31, 1859.

*To all whom it may concern:*

Be it known that I, ALBERT P. PITKIN, of Hartford, county of Hartford, and State of Connecticut, have invented certain new and useful Improvements in Screw-Plates; and I do hereby declare that the same is described and represented in the following specifications and drawings, and to enable others skilled in the art to make and use the same I will proceed to describe the construction and operation, referring to the drawings, in which the same letters indicate like parts in each of the figures.

The nature of this improvement consists in constructing hand screw plates, complete in one piece of metal, having their openings in the edge for the insertion of the cutting die.

In the accompanying drawings, Figure 1, is an edge view showing a piece of piping passing through the plate and die, one end having a thread cut thereon, and the other end broken off. Fig. 2, is an edge, sectional view, showing the plate, die and guide collar. Fig. 3, shows the side having a guide-collar, which is first placed upon the pipe, or rod, upon which it is desirable to cut a thread. Fig. 4, shows the opposite side having an opening for the screw, pipe, or rod, to pass after it is cut.

A, is the plate.
N, is the die.
I, is the collar.
T, is the pipe or rod.
K, are strengthening or ornamental ribs.
P, P', are the plates between which the die is inserted.
F, is a screw or pin, to secure the die in place.

The design and object of this improvement is, to construct in the most ready and easy manner a cheap and convenient, new and useful screw plate for receiving the solid cutting die B, into the edge between the plates P, P', for the ordinary purpose of cutting threads on piping, or rods, for bolts &c.

By this mode of constructing screw plates several advantages are derived over others now in use. First the plate is stronger, from the fact, that both the upper and lower plates are formed of the same piece of metal, with the arms A'. Second the die N can be more readily inserted and removed when desirable, by the most inexperienced workman. Third they can be manufactured at much less expense than those now in use, and thereby removing the extra labor and necessity of making and fitting plates screws &c. as in those now in use, and in establishments where a large number of hands are employed, it will be found quite a desideratum, as the cost in fitting out each hand with this tool alone will be half or three fourths less than the cost of those now in use.

I do not claim the manner of introducing the die as patented by Peter H. Watson Dec. 3 1846.

What I claim therefore and desire to secure by Letters Patent is—

1. Making a screw plate A with both top and bottom parts P, P', which hold the die N, cast or made onto the screw plate A in the manner as and for the purpose described.

2. I further claim the making the inlet for the introduction of the die N, into its chamber between the parts P, P', through the outside edge of the screw plate A as and for the purpose described.

ALBERT P. PITKIN. [L. S.]

Witnesses:
EDWARD M. BLISS,
JEREMY W. BLISS.